United States Patent

Miya

Patent Number: 6,163,705
Date of Patent: Dec. 19, 2000

[54] COMMUNICATION SYSTEM AND A COMMUNICATION APPARATUS

[75] Inventor: Kazuyuki Miya, Kawasaki, Japan

[73] Assignee: Matsushita Electric Industrial Co., Ltd., Osaka, Japan

[21] Appl. No.: 08/905,558

[22] Filed: Aug. 4, 1997

[30] Foreign Application Priority Data

Aug. 7, 1996 [JP] Japan .................................. 8-223286

[51] Int. Cl.$^7$ .................................................. H04B 7/00
[52] U.S. Cl. ...................... 455/522; 455/572; 455/38.3; 455/574
[58] Field of Search ................... 455/127, 522, 455/383, 343, 574, 421, 517; 375/200; 370/342, 318, 335, 441

[56] References Cited

U.S. PATENT DOCUMENTS

| | | | |
|---|---|---|---|
| 5,257,283 | 10/1993 | Gilhousen et al. | 375/200 |
| 5,267,262 | 11/1993 | Wheatley, III | 375/200 |
| 5,345,598 | 9/1994 | Dent | 455/522 |
| 5,383,219 | 1/1995 | Wheatley, III et al. | 370/342 |
| 5,412,686 | 5/1995 | Ling . | |
| 5,485,486 | 1/1996 | Gilhousen et al. | 370/335 |
| 5,566,165 | 10/1996 | Sawahashi et al. | 370/342 |
| 5,574,984 | 11/1996 | Reed et al. | 455/69 |
| 5,678,198 | 10/1997 | Lemson | 455/67.1 |

FOREIGN PATENT DOCUMENTS

| | | |
|---|---|---|
| 0682417 | 11/1995 | European Pat. Off. . |
| 0682419 | 11/1995 | European Pat. Off. . |
| 0696587 | 2/1996 | European Pat. Off. . |
| 613956 | 1/1994 | Japan . |
| 832513 | 2/1996 | Japan . |
| 832514 | 2/1996 | Japan . |
| 8-37515 | 6/1996 | Japan . |

OTHER PUBLICATIONS

Qualcomm, The CDMA Network Engineering Handbook, ch8, Power Control.
"Power Control by employing Interference Power for DS/CDMA" by T. Dohi et al; TechnicalReport of IEICE. A.P94–75, RCS94–99 (Oct. 1994); pp., 63–68.

*Primary Examiner*—Dwayne D. Bost
*Assistant Examiner*—Sonny Trinh
*Attorney, Agent, or Firm*—Stevens, Davis, Miller & Mosher, L.L.P.

[57] ABSTRACT

A COMM system is disclosed which comprises mobile stations and a base station. The mobile station comprises; a 1st receiving and transmitting portion; a detection portion for detecting an electric power of a 1st desired wave component of the received 1st CDMA SIG; a table for storing a relation between reception power and transmission power of a 2nd CDMA SIG to be transmitted; a demodulation portion for demodulating the received 1st CDMA SIG and for detecting a CONT SIG in the desired wave; a compensation portion for compensating the relation according to the detected CONT SIG; and a transmission power CONT portion for controlling a transmission power determined according to the electric power obtained through the compensated table and the reception power. The base station comprises; a 2nd receiving and transmitting portion; an power detection portion for repeatedly detecting an electric power of a 2nd desired wave component of the received 2nd CDMA SIG; an averaging portion for averaging the repeatedly detected electric powers to obtain an average; and a CONT SIG generation portion for generating the CONT SIG according to an error between the average and a given value. The relation is corrected within a portion of range of the reception power or within a range of transmission power.

7 Claims, 12 Drawing Sheets

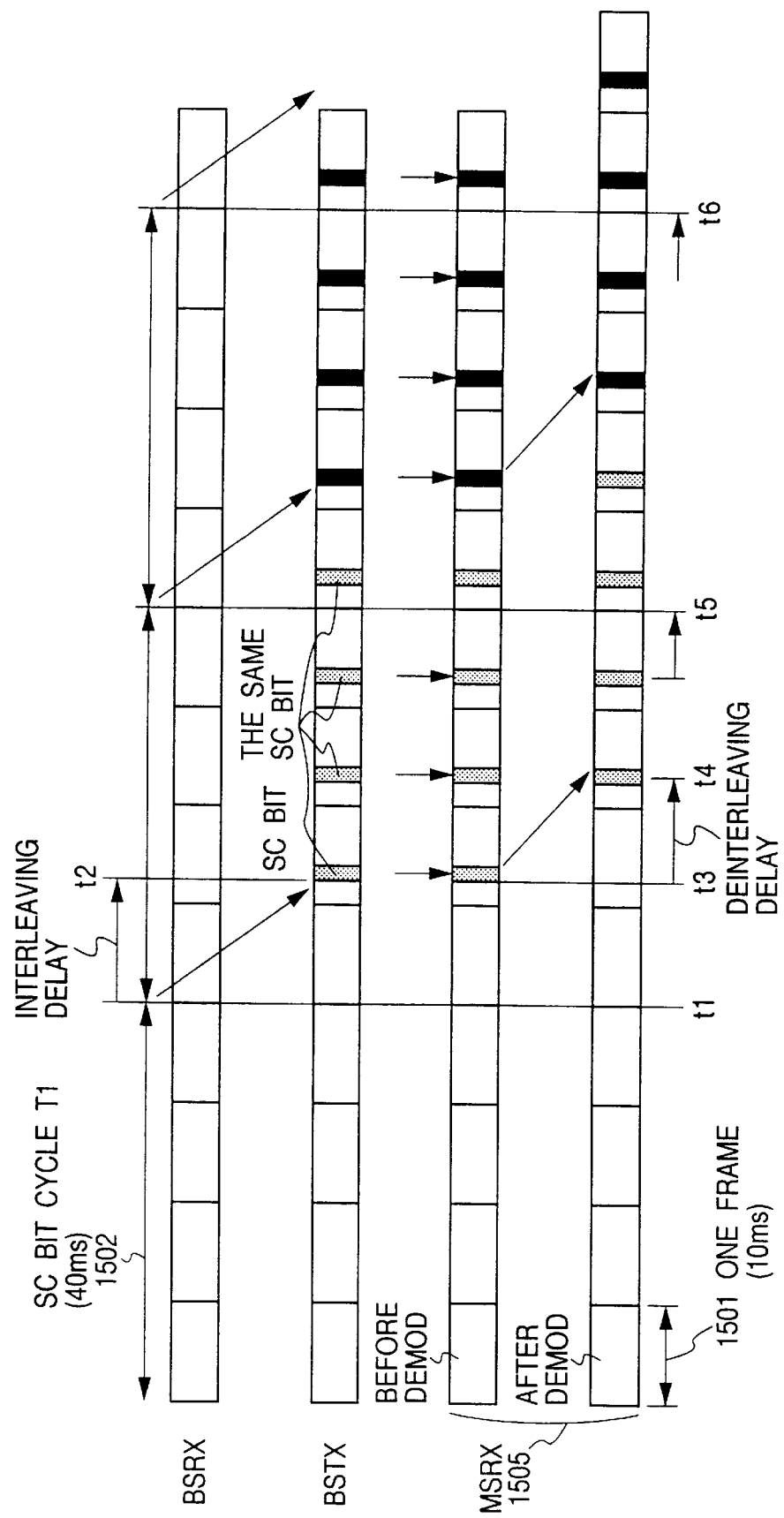

COMMUNICATION SYSTEM AND A COMMUNICATION APPARATUS

BACKGROUND OF THE INVENTION

1. Field of the Invention

This invention relates to a communication apparatus having transmission electric power control circuit, a communication apparatus having a control signal generation circuit generating a control signal indicative of compensating a table for determining a transmission power and a communication system in which transmission electric power is controlled.

2. Description of the Prior Art

A communication apparatus having transmission electric power control circuit is disclosed in Japanese patent application provisional publication No. 6-13956. In such a prior art communication apparatus, a transmission electric power is determined in accordance with an electric power of the received pilot signal. The pilot signal is detected by a mobile unit and used to estimate the power of transmission of the mobile unit. A spread spectrum communication equipment with transmission power controlled is also disclosed in Japanese patent application provisional publication No. 08032513A. In such a prior art spread spectrum communication equipment, a transmission power of a base station is determined in accordance with a detected control bit from a mobile unit.

There are two types of controlling transmission power in mobile unit communication employing the CDMA system, that is, an open loop control effected by a mobile unit in accordance with the detected electric power of the received signal and a closed loop control effected by feeding back a control signal to a mobile station from a base station.

Tomohiro Doi and Mamoru sawahashi disclosed Power control by employing Interference Power for DS/CDMA in TECHNICAL REPORT OF IEICE. A-P94-75, RCS94-99 (1994-10) at p63–68 by THE INSTITUTE OF ELECTRONICS. INFORMATION AND COMMUNICATION ENGINEERS. A transmission power at a mobile unit is controlled such that a Signal to Interference-plus-Noise power Ratio (SINR) is maintained at a constant value at a base station through a transmission power control bit (TPC bit) from the base station to the mobile unit to provide a closed loop controlling. The mobile unit increases or decreases the transmission power in accordance with the TPC bit periodically inserted in a data frame.

SUMMARY OF THE INVENTION

The aim of the present invention is to provide an improved communication apparatus and an improved communication system.

According to the present invention, a first communication apparatus is provided, which comprises: a receiving and transmitting portion having an antenna for receiving a first CDMA radio wave signal, detecting a desired wave component including a control signal from the first CDMA radio wave signal, and transmitting a second CDMA radio wave signal; a detection portion for detecting an electric power of the detected desired wave component; a table portion for storing a relation between the detected electric power and an electric power of the second CDMA radio wave signal to be transmitted, the control signal indicating compensation of the relation; a demodulating and detection portion for demodulating the detected desired wave component and outputting demodulation data and for detecting the control signal from the detected desired wave component; a compensation portion for compensating the relation in accordance with the detected control signal; a determining portion for determined an actual electric power of the second CDMA radio wave signal to be transmitted in accordance with the compensated the relation; and a transmission power control portion for controlling a transmission power of the second CDMA radio wave signal in accordance with the actual electric power.

The first communication apparatus may further comprise: a sampling and storing portion for sampling and storing the detected electric power; and a compensating range determining portion for determining a portion of a range of the detected electric power in accordance with the stored detected electric power, wherein the compensation portion compensates the relation within the range.

In the first communication apparatus, the compensation portion may comprise an allowable range data receiving portion for receiving allowable range data and the compensation portion compensates the relation within the allowable range of the electric power of the second CDMA radio wave signal to be transmitted in accordance with the received allowable range data.

According to the present invention, a second communication is provided, which comprises: a transmitting and receiving portion having an antenna for transmitting a first CDMA radio wave signal including a control signal, receiving a second CDMA radio wave signal, and detecting a desired wave component from the second CDMA radio wave signal; an electric power detection portion for repeatedly detecting an electric power of the desired wave component of the received second CDMA radio wave signal; an averaging portion for averaging the repeatedly detected electric powers to obtain an average; a comparing portion for obtaining an error between the average and a target value and comparing the error with a predetermined value; and a control signal generation portion for generating the control signal when the error exceeds the predetermined value.

According to the present invention, a third communication apparatus is provided, which comprises: a transmitting and receiving portion having an antenna for transmitting a first CDMA radio wave signal including a control signal, receiving a second CDMA radio wave signal, and detecting a desired wave component and interference wave components from the second CDMA radio wave signal; a first electric power detection portion for detecting a first electric power of the desired wave component; a second electric power detection portion for detecting a second electric power of the detected interference wave components; an operation portion for operating a signal to interference power ratio from the detected first and second electric powers; a comparing portion for obtaining an error between the signal to interference power ratio and a target value and comparing the error with a predetermined value; and a control signal generation portion for generating the control signal when the error exceeds the predetermined value.

According to the present invention, a fourth communication apparatus is provided, which comprises: a transmitting and receiving portion having an antenna for transmitting a first CDMA radio wave signal including a control signal, receiving a second CDMA radio wave signal; an error rate detection portion for detecting an error rate from the received second CDMA radio wave signal; a comparing portion for obtaining an error between the error rate and a target value and comparing the error with a predetermined value; and a control signal generation portion for generating the control signal when the error exceeds the predetermined value.

According to the present invention, a communication system is provided, which comprises a plurality of mobile stations and a base station. Each of the mobile stations comprises: a receiving and transmitting portion having a first antenna for receiving a first CDMA radio wave signal, detecting a first desired wave component including a control signal, and transmitting a second CDMA radio wave signal; a detection portion for detecting an electric power of a first desired wave component of the received first CDMA radio wave signal; a table portion for storing a relation between the detected electric power and an electric power of the second CDMA radio wave signal to be transmitted, the control signal indicating compensation of the relation; a demodulation and detection portion for demodulating the received first desired wave component and outputting demodulation data and for detecting the control signal from the received first desired wave component; a compensation portion for compensating the relation in accordance with the detected control signal; a determining portion for determined an actual electric power of the second CDMA radio wave signal to be transmitted in accordance with the compensated the relation; and a transmission power control portion for controlling a transmission power of the second CDMA radio wave signal in accordance with the actual electric power.

The base station comprises: a transmitting and receiving portion having a second antenna for transmitting the first CDMA radio wave signal including the control signal, receiving the second CDMA radio wave signal, and detecting a second desired wave component from the second CDMA radio wave signal; an electric power detection portion for repeatedly detecting an electric power of a second desired wave component of the received second CDMA radio wave signal; an averaging portion for averaging the repeatedly detected electric powers to obtain an average; a comparing portion for obtaining an error between the average and a target value and comparing the error with a predetermined value; and a control signal generation portion for generating the control signal when the error exceeds the predetermined value.

In the communication system, each of the mobile stations may further comprise: a sampling and storing portion for sampling and storing the detected electric power; and a compensating range determining portion for determining a portion of a range of the detected electric power in accordance with the stored detected electric power, wherein the compensation portion compensates the relation within the range.

In the communication system, the compensation portion comprises an allowable range data receiving portion for receiving allowable range data and the compensation portion compensates the relation within the allowable range of the electric power of the second CDMA radio wave signal to be transmitted in accordance with the received allowable range data.

BRIEF DESCRIPTION OF THE DRAWINGS

The object and features of the present invention will become more readily apparent from the following detailed description taken in conjunction with the accompanying drawings in which:

FIG. 15 shows a timing chart of the communication apparatus of the seventh embodiment.

The same or corresponding elements or parts are designated with like references throughout the drawings.

DETAILED DESCRIPTION OF THE INVENTION

<A FIRST EMBODIMENT>

Figure 1:
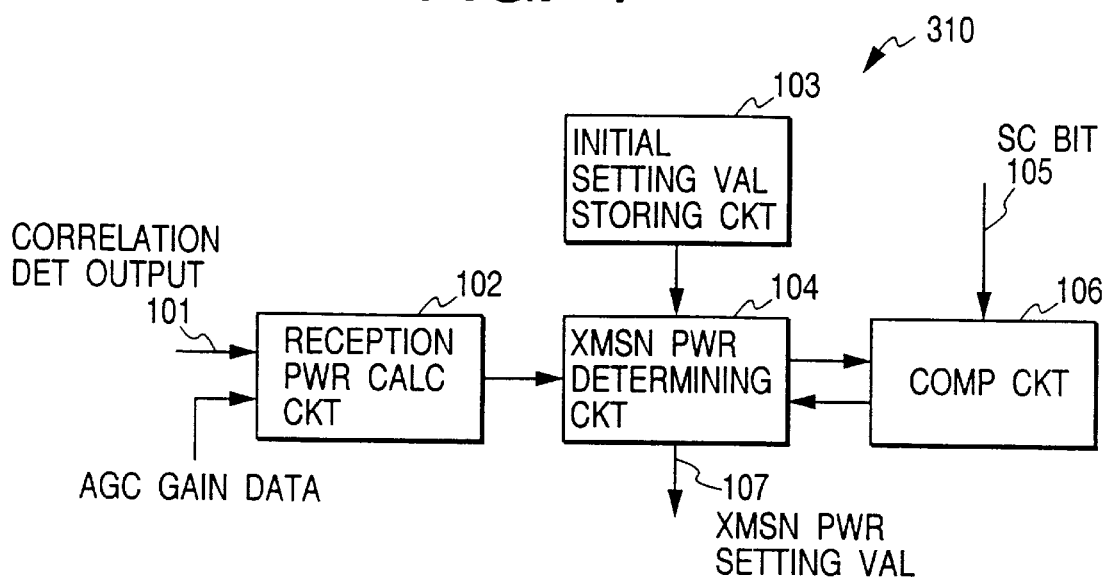
FIG. 1 is a block diagram of a transmission power control circuit of a first embodiment.

FIG. 1 is a block diagram of a transmission power control circuit of a first embodiment.

A correlation detection output 101 is supplied to a reception power calculation circuit 102. The reception power calculation circuit 102 calculates a reception power of a desired wave component at an antenna. A calculated reception power is supplied to a transmission power determining circuit 104. The transmission power determining circuit 104 determines a transmission power setting value 107 from the calculated reception power in accordance with an initial setting value from an initial setting value storing circuit 103 through a power control table included therein in a power on condition or a reset-start condition. During communication, i.e., in a normal condition, a compensation circuit 106 compensates the power control table stored in the transmission power determining circuit 104 in accordance with a control bit (hereinafter referred to as a sc bit) indicative of compensating the transmission power table which represents a relation between a reception power and a transmission power. The transmission power determining circuit 104 determines the transmission power setting value in accordance with the calculated reception power through the compensated power control table. If a level adjustment is effected before the correlation detection such as an AGC circuit or the like in the reception system, the reception power calculation circuit 102 calculates the reception power in accordance with an AGC gain in addition to the correlation detection output 101. The sc bit is detected from a demodulation result.

Figure 2:
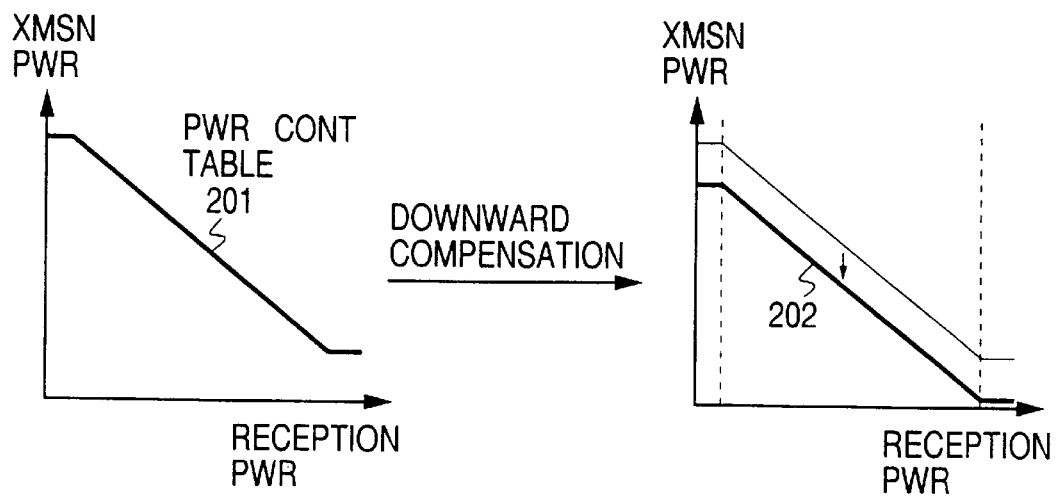
FIG. 2 is a graphical drawing showing the power control table in the transmission power determining circuit 104 shown in FIG. 1.

FIG. 2 is a graphical drawing showing the power control table in the transmission power determining circuit 104 shown in FIG. 1. When the sc bit is indicative of decreasing the transmission power, the compensation circuit 106 compensates the power control table 201 in a decreasing direction and thus, a compensated power control table 202 is obtained with the transmission power decreased over a whole range of the reception power. An amount of the compensation in response to one pulse of the sc bit is determined by data in the sc bit or alternatively, it is determined data stored in the compensation circuit 106.

Figure 3:
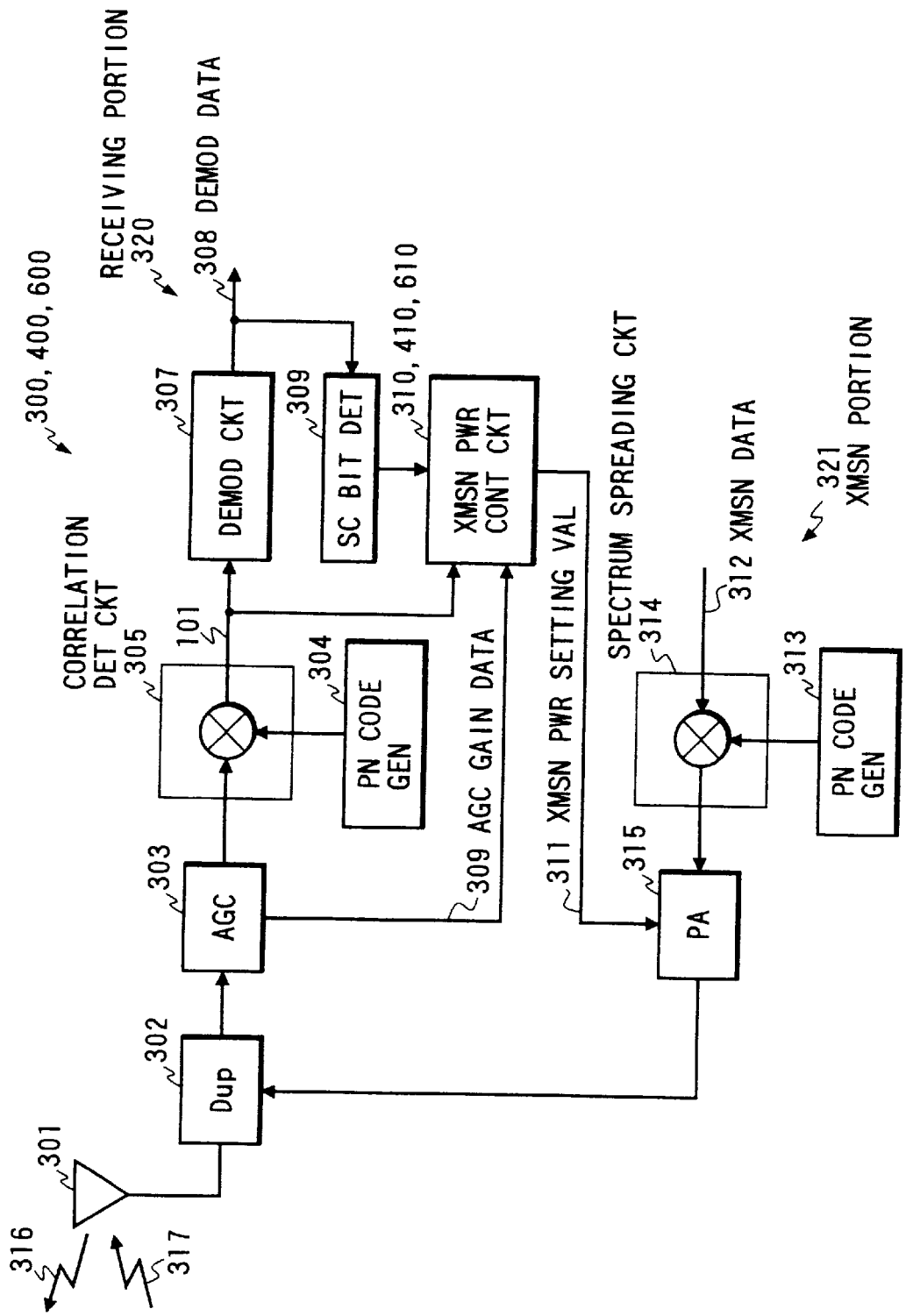
FIG. 3 is a block diagram of a communication apparatus according to the first to third embodiments.

FIG. 3 is a block diagram of a communication apparatus of the first embodiment including the transmission power control portion, which is also referred in second and third embodiments. The communication apparatus of the first embodiment, as a mobile unit, comprises an antenna 301, a duplexer 302, a receiving portion 320, the transmission power control circuit 310, and a transmission portion 321.

The an antenna 301 receives a first CDMA radio wave signal 316 including the sc bit and transmitting a second CDMA radio wave signal 317. The duplexer 302 duplexes the received first CDMA radio wave signal with the second CDMA radio wave signal. The receiving portion 320 includes an AGC circuit 303 for amplifying the received first CDMA radio wave signal with a gain controlled and supplying data of the gain to the transmission power control circuit 310, a PN (pseudo noise) code generator 304 generating a PN code; a correlation detection circuit 305 detects a correlation between the first CDMA radio wave signal from the AGC circuit 303 and the PN code from the PN code generator 304 and outputs a correlation result as a desired wave 101; a demodulation circuit 307 demodulates the correlation result and outputs a demodulation data 308 including the sc bit, and a sc bit detector 309 for detecting and supplying the sc bit from the demodulation data 308 to the transmission power control circuit 310.

The transmission portion 321 includes a PN code generator 313 for generating a second PN code, a spectrum spreading circuit for spectrum-spreading transmission data with the second PN code, and a power amplifier 315 for amplifying the output of the spectrum spreading circuit 314 with the transmission power controlled in accordance with the transmission power setting value from the transmission power control circuit 310. The amplified transmission data is supplied to the duplexer 302 and transmitted by the antenna 301 as the second CDMA radio wave signal 317.

The AGC circuit 303 amplifies the received first CDMA radio wave signal with the gain controlled to have a constant intensity and supplies the data of the gain, i.e., AGC gain data, to the transmission power control circuit 310. The PN code generator 304 generates the PN code assigned to this communication apparatus. The correlation detection circuit 305 detects the correlation between the first CDMA radio wave signal from the AGC circuit 303 and the PN code from the PN code generator 304 to effect an inverse-spectrum-spreading and outputs the correlation result as a desired wave component. The demodulation circuit 307 demodulates the correlation result, effects a carrier removing processing, an error correction processing and outputs the demodulation data 308 including the sc bit. The a sc bit detector 309 detects the sc bit periodically transmitted. The sc bit 105 is included in a data frame at a predetermined position of the data frame and supplies the sc bit 105 to the transmission power control circuit 310.

Regarding the compensation, it is sufficient that the compensation of the power control table 201 in response to the sc bit 105 is effected to trace a variation due to a temperature characteristic, a traffic variation or the like. Therefore, it is clear that a control cycle by the sc bit 105 (hereinafter referred to as sc bit cycle) T1 is considerably longer than a controlling cycle T2 of transmission power controlling provided for the fading variation in accordance with the reception power (T1>T2). Therefore, the sc bit is transmitted in a low speed accompanied channel (SACCH). In other words, the controlling cycle T1 is longer than a transmission cycle of the conventional closed loop controlling.

As mentioned, in the communication apparatus of the first embodiment, the transmission power is controlled for the fading variation in accordance with the calculated reception power through a power control table as an open loop controlling. In addition, the power control table is compensated for the traffic variation in accordance with the control signal, that is, the sc bit periodically transmitted from the base station, wherein the controlling cycle T1 of the transmission power controlling by the sc bit is longer that the controlling cycle of the calculated reception power.

<A SECOND EMBODIMENT>

Figure 4:
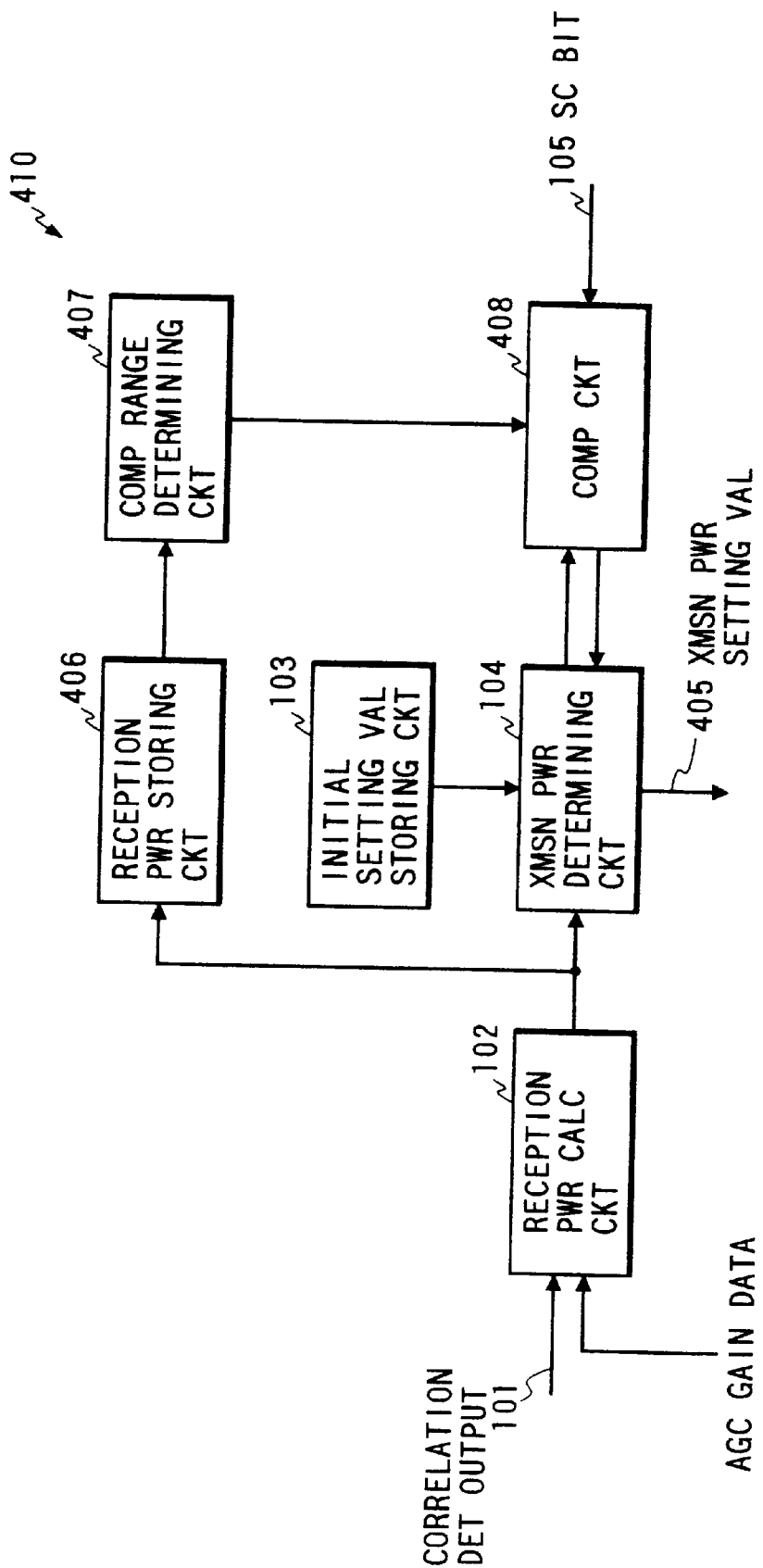
FIG. 4 is a block diagram of a transmission power control circuit of the second embodiment.
Figure 5:
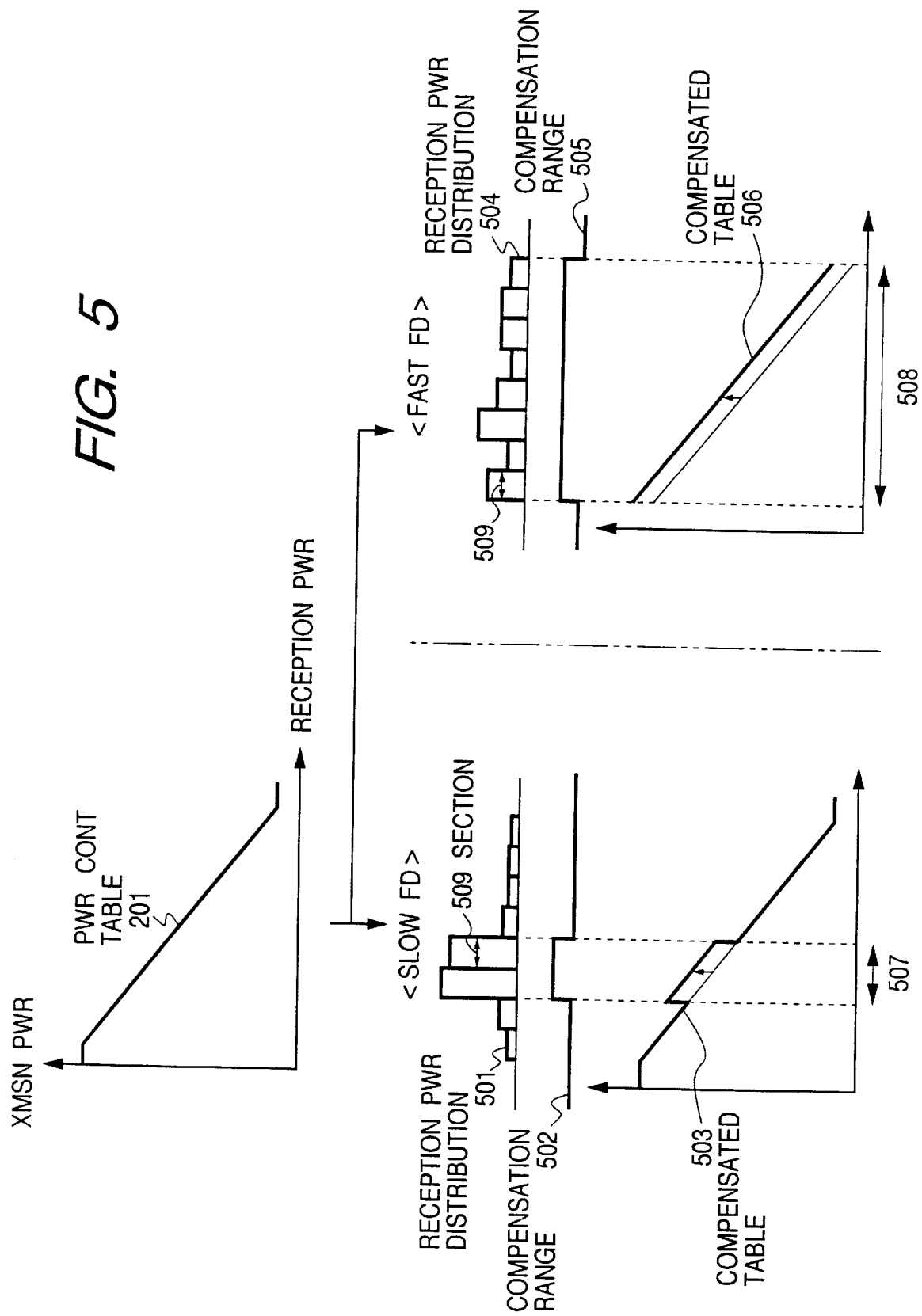
FIG. 5 is a graphical drawing illustrating compensation of the transmission power control table in the second embodiment.

FIG. 4 is a block diagram of a transmission power control circuit 410 of a second embodiment and a communication apparatus 400 of the third is shown in FIG. 3. FIG. 5 is a graphical drawing illustrating compensation of the transmission power control table in the second embodiment. A communication apparatus 400 of a second embodiment has substantially the same structure and operation as that of the first embodiment. The difference is that a reception power storing circuit 406 and a compensation range determining circuit 407 are further provided and the compensation circuit 408 compensates the power control table in the transmission power determining circuit 104 with a compensation range controlled.

The reception power calculation circuit 102 calculates a reception power of a desired wave component at an antenna. A calculated reception power is supplied to a transmission power determining circuit 104. The transmission power determining circuit 104 determines a transmission power setting value 405 from the calculated reception power in accordance with an initial setting value from an initial setting value storing circuit 103 through a power control table included therein in a power on condition or a reset-start condition. During communication, i.e., in a normal condition, a compensation circuit 408 compensates the power control table stored in the transmission power determining circuit 104 in accordance with the sc bit indicative of compensating the transmission power table which represents a relation between a reception power and a transmission power. The transmission power determining circuit 104 determines the transmission power setting value 405 in accordance with the calculated reception power through the compensated power control table. If a level adjustment is effected before the correlation detection such as an AGC circuit or the like in the reception system, the reception power calculation circuit 102 calculates the reception power in accordance with an AGG gain in addition to the correlation detection output 101.

The reception power calculation circuit 102 calculates the reception power of the desired wave component at the antenna 301. A calculated reception power is supplied to a transmission power determining circuit 104. The transmission power determining circuit 104 determines a transmission power setting value 405 from the calculated reception power in accordance with the initial setting value from the initial setting value storing circuit 103 through the power control table 201 included therein in the power on condition or the reset-start condition. During communication, the reception power is stored in the reception power storing circuit 406 with a sampling interval. The compensation range determining circuit 407 obtains a reception power distribution 501 from the stored reception power storing circuit 406 as shown in FIG. 5. The compensation range determining circuit 407 analyzes the reception power distribution 501 or 504 and determines sections 509 of which frequencies (the number of times per a predetermined interval) of the occurrences of reception power values at respective sections are relatively high. If the variation due to a fading is slow, the reception power distribution 501 is provided. Then, the compensation range determining circuit 407 determines the compensation range 507 from the sections 509 where the frequencies are high. The compensation circuit 408 compensates the power control table with transmission power values in the compensation range 507 in response to the sc bit 105. The transmission power determining circuit 104 determines the transmission power setting value 405 in accordance with the compensated power control table 503. The amplifier 315 amplifies the spectrum-spread transmission data with the transmission power controlled with the transmission setting value 405 from the transmission power control circuit 410.

If the variation due to a fading is fast, the reception power distribution 504 is provided, wherein the variation due to fading occurs over the whole reception power range. Then, the compensation range determining circuit 407 determines the compensation range 508 wherein there is no section where the frequency of reception power value is relatively high than other sections. The compensation circuit 408 compensates the power control table with transmission power values in the compensation range 508 compensated in response to the sc bit 105. The transmission power determining circuit 104 determines the transmission power setting value in accordance with the compensated power control table 506. The amplifier 315 amplifies the spectrum-spread transmission data with the transmission power is controlled with the transmission setting value 405 from the transmission power control circuit 410.

As mentioned, the communication apparatus of the second embodiment controls the transmission power in accordance with the distribution of sampled and stored reception power through analyzing to adaptively control the transmission power in accordance with a variation speed due to fading in addition to the controlling according to the first embodiment. A period for obtaining the reception power distribution may agree or disagree with a period for determining the sc bit in the base station.

<THIRD EMBODIMENT>

Figure 6:
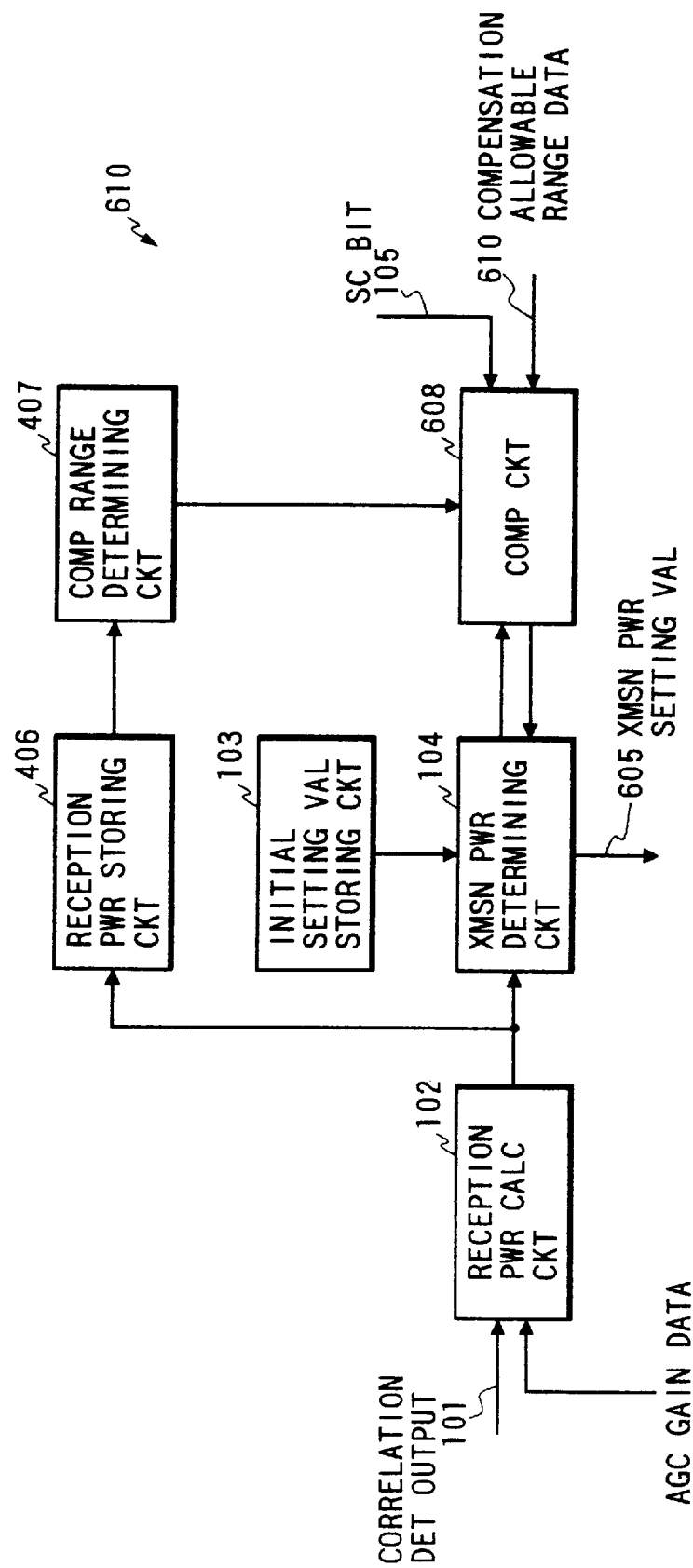
FIG. 6 is a block diagram of a transmission power control circuit of a third embodiment.

FIG. 6 is a block diagram of a transmission power control circuit 610 of a third embodiment and a communication apparatus 600 of the third embodiment is also shown in FIG. 3. The communication apparatus 600 of the third has substantially the same structure and operation as that of the second embodiment. The difference is that the compensation circuit 608 receives a compensation allowable range data and compensates the power control table within the compensation allowable range indicated by the compensation allowable range data.

The reception power calculation circuit 102 calculates a reception power of the desired wave component at the antenna 301. The calculated reception power is supplied to a transmission power determining circuit 104. The transmission power determining circuit 104 determines a transmission power setting value 605 from the calculated reception power in accordance with the initial setting value from the initial setting value storing circuit 103 through the power control table included therein in the power on condition or the reset-start condition. During communication, the compensation circuit 608 compensates the power control table stored in the transmission power determining circuit 104 in accordance with the sc bit indicative of compensating the transmission power table within the compensation allowable range of the transmission power in accordance with the compensation allowable range data 610.

Figure 7:
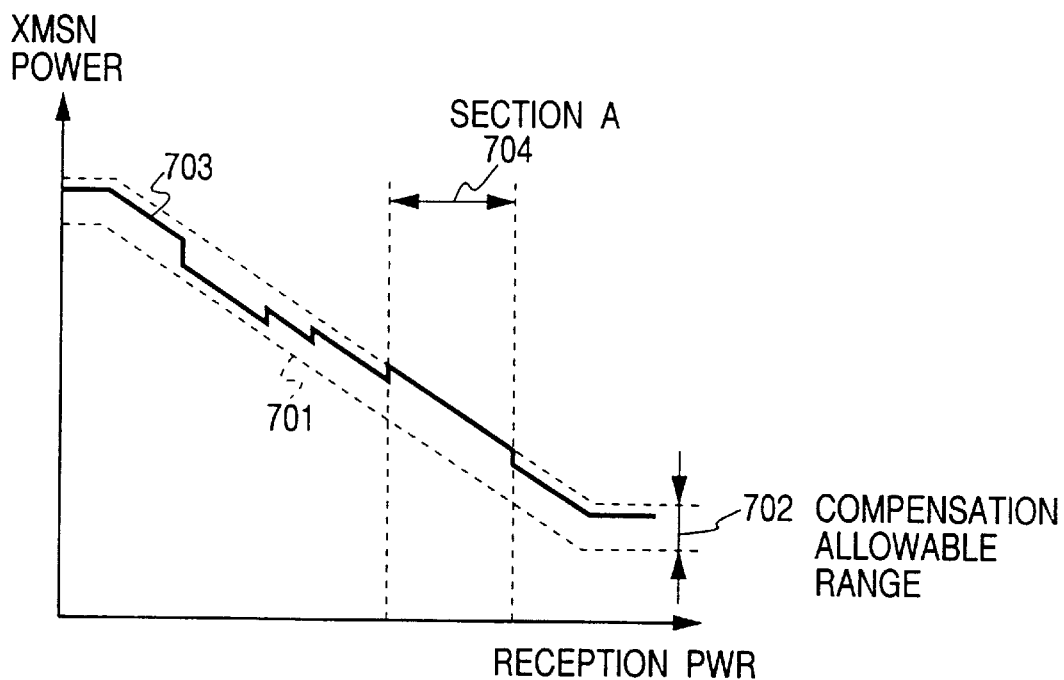
FIG. 7 is a graphical drawing illustrating compensation of the transmission power control table in the third embodiment.

FIG. 7 is a graphical drawing illustrating compensation of the transmission power control table in the third embodiment, wherein transmission power values are partially and repeatedly compensated in response to sc bits, wherein at a section A the transmission power values reaches an upper limit of the compensation allowable range. Therefore, the transmission power value at the section A is not change further. At other sections, the transmission power values can be compensated.

According to this embodiment, the transmission power controlling is effected with the compensation allowable range. Then, it is prevented that all communication apparatus enter a divergent condition by that all communication apparatus compensate the power control tables in the increasing direction successively.

The compensation allowable range is provided with only upper limit, only lower limit, or upper and lower limits.

<FOURTH EMBODIMENT>

Figure 8:
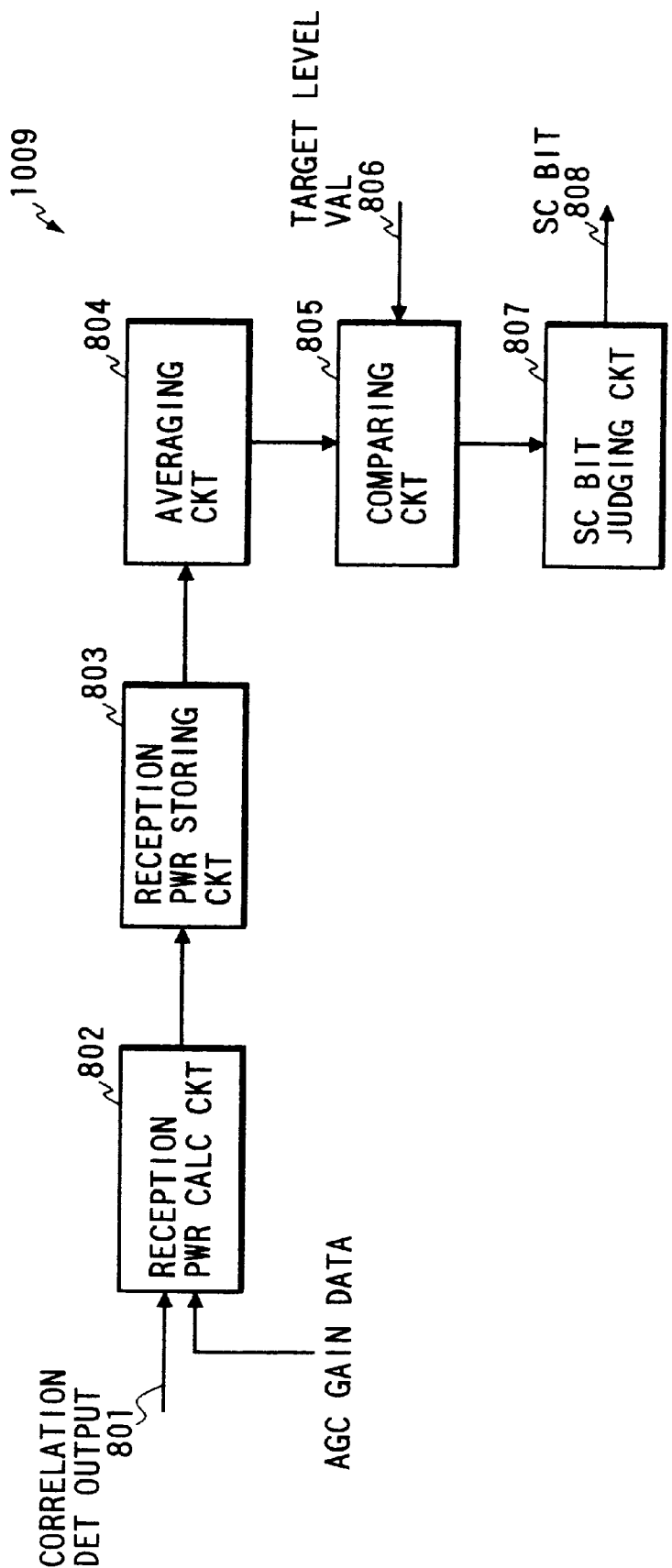
FIG. 8 is a block diagram of a transmission power control signal generation portion of a fourth embodiment.
Figure 10:
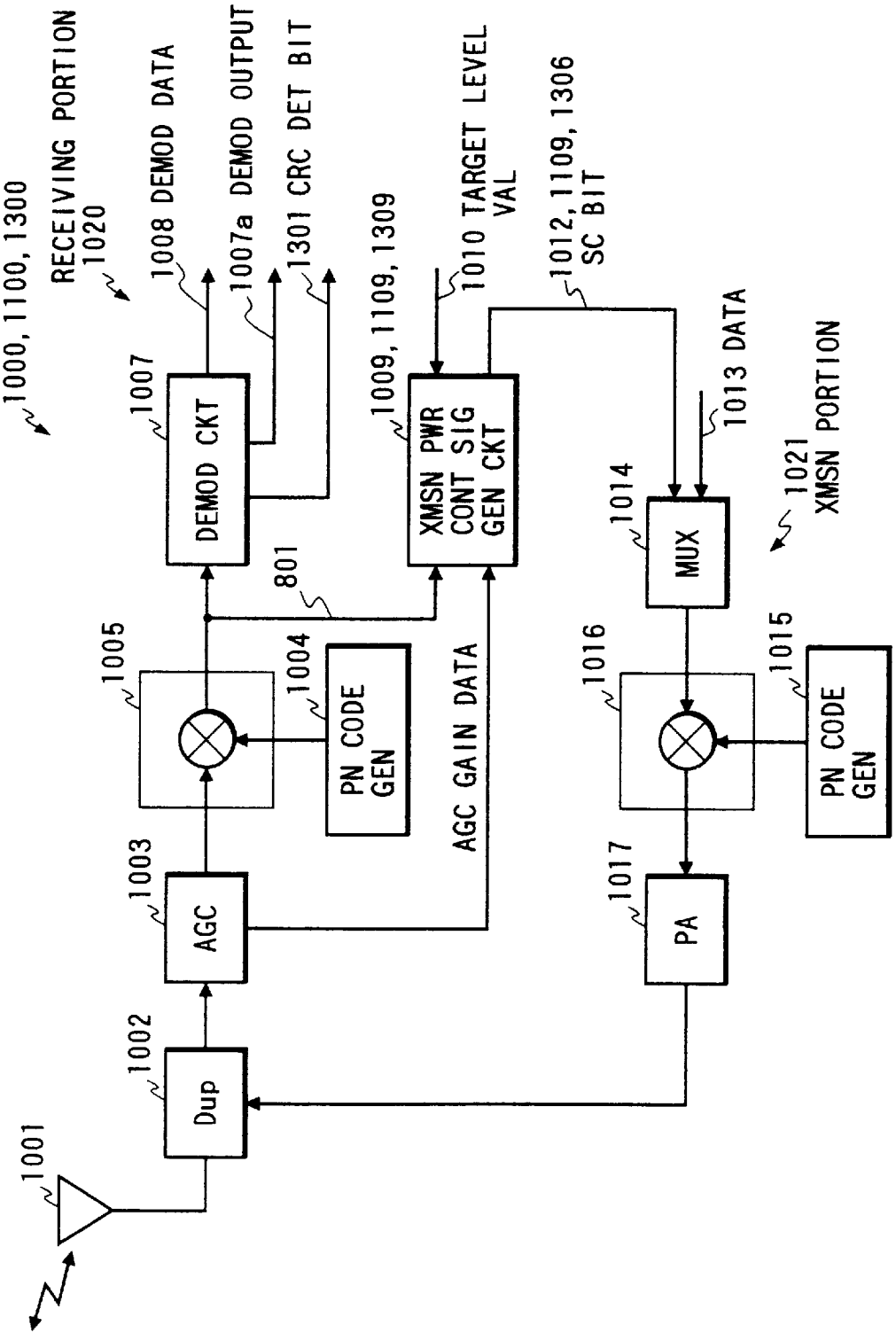
FIG. 10 is a block diagram of a communication apparatus according to the fourth to sixth embodiments.

FIG. 8 is a block diagram of a transmission power control signal generation portion 1009 of a fourth embodiment and FIG. 10 is a block diagram of a communication apparatus 1000 of the fourth embodiment, which is also referred in later embodiments.

The transmission power control signal generation circuit 1009 comprises a reception power calculation circuit 802 for calculating a reception power of a desired wave component at an antenna 1001 in consideration of an AGC gain data; a reception power storing circuit 803 for storing the calculated reception power values; an averaging circuit 804 for averaging the calculated reception power values; a comparing circuit 805 for comparing the averaged reception power value with a target level value 806, wherein the comparing circuit 805 obtains an error from the difference between the averaged reception power value and the target level value 806; and an sc bit judging circuit 807 for judging whether the error exceeds a predetermined value and generating the sc bit 808 if the error exceeds the predetermined value.

The reception power calculation circuit 802 periodically calculates the reception power of a desired wave component at the antenna 1001. The calculated reception power is stored in the reception power storing circuit 803. The averaging circuit 804 averages the calculated reception power values from the reception power storing circuit 803. The comparing circuit 805 compares the averaged reception power value with the target level value 806 and obtains the error from the difference between the averaged reception power value and the target level value 806. The error is supplied to the sc bit judging circuit 807 as a transmission power setting error. The sc bit judging circuit 807 judges whether the transmission power setting error exceeds the predetermined value and generates the sc bit 808 if the error exceeds the predetermined value.

Figure 9:
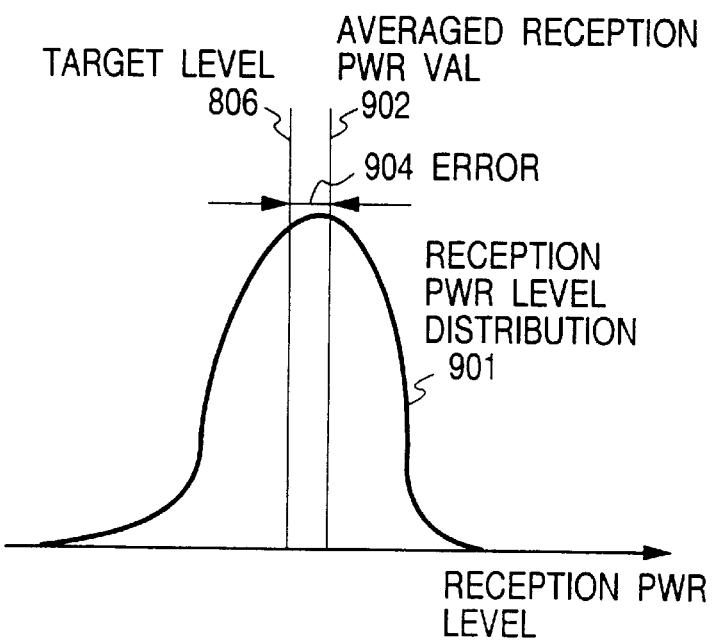
FIG. 9 is a graphical drawing of the fourth embodiment illustrating obtaining an error.

FIG. 9 is a graphical drawing of the fourth embodiment illustrating obtaining the error 904 between the target level 806 and the averaged reception power value 902. In this embodiment, the error is determined from the averaged reception power value. However, it is also possible to provide the error from a center value or a reception power value having a higher possibility from the reception power level distribution 901. The amount of the correction is determined by a variance of the reception power level distribution 901 and is transmitted in the sc bit.

If a level adjustment is effected before the reception power calculation such as an AGC circuit or the like in the reception system, the reception power calculation circuit 802 calculates the reception power in accordance with an AGC gain in addition to the correlation detection output 801.

The communication apparatus 1000 of the fourth embodiment, as a base station, comprises an antenna 1001, a duplexer 1002, a receiving portion 1020, the transmission power control signal generation circuit 1009 for generating a transmission power control signal, as the sc bit, and a transmission portion 1021.

The antenna 1001 transmits the first CDMA radio wave signal and receives the second CDMA radio wave signal from a mobile unit. The duplexer 1002 duplexes the received second CDMA radio wave signal with the first CDMA radio wave signal. The receiving portion 1020 includes an AGC circuit 1003 for amplifying the received second CDMA radio wave signal with a gain controlled and supplies data of the gain, i.e., AGC gain data, to the transmission power control signal generation circuit 1009, a PN code generator 1004 for generating a PN code; a correlation detection circuit 1005 for detecting a correlation between the second CDMA radio wave signal from the AGC circuit 1003 and the PN signal from the PN code generator 1004 and outputting a correlation result of the desired wave, and a demodulation circuit 1007 for demodulating the correlation result and outputting a demodulation data 1008.

The transmission portion 1021 comprises a multiplexer for multiplexing data to be transmitted with the sc bit to output a multiplexed transmission data, a PN code generator 1015 for generating a PN code, a spectrum spreading circuit 1016 for spectrum-spreading the multiplexed transmission data with the PN code from the PN code generator 1015, and a power amplifier 1017 for amplifying the output of the spectrum spreading circuit 1014 with the transmission power is controlled. The amplified transmission data is supplied to the duplexer 1002 and transmitted by the antenna 1001 as the first CDMA radio wave signal.

The AGC circuit 1003 amplifies the received first CDMA radio wave signal with the gain controlled to have a constant intensity and supplies the data of the gain, i.e., the AGC gain data, to the transmission power control circuit 1009. The PN code generator 1004 generates the PN signal assigned to the mobile unit to be communicated. The correlation detection circuit 1005 detects the correlation between the second CDMA radio wave signal from the AGC circuit 1003 and the PN signal from the PN code generator 1004 to effect inverse-spectrum-spreading and outputs the correlation result of the desired wave component. The demodulation circuit 1007 demodulates the correlation result, that is removes a carrier component and outputs a demodulation output 1007a. The demodulation circuit 1007 further effects an error correction processing, and outputs the demodulation data 1008 and CRC detection bit 1301.

The transmission power control signal generation circuit 1009 generates the transmission power control signal as the sc bit from the correlation detection output 801 and the AGC gain data. The transmission portion 1021 transmits transmission data including the sc bit 1012 spectrum spread from the antenna 1001.

<FIFTH EMBODIMENT>

Figure 11:
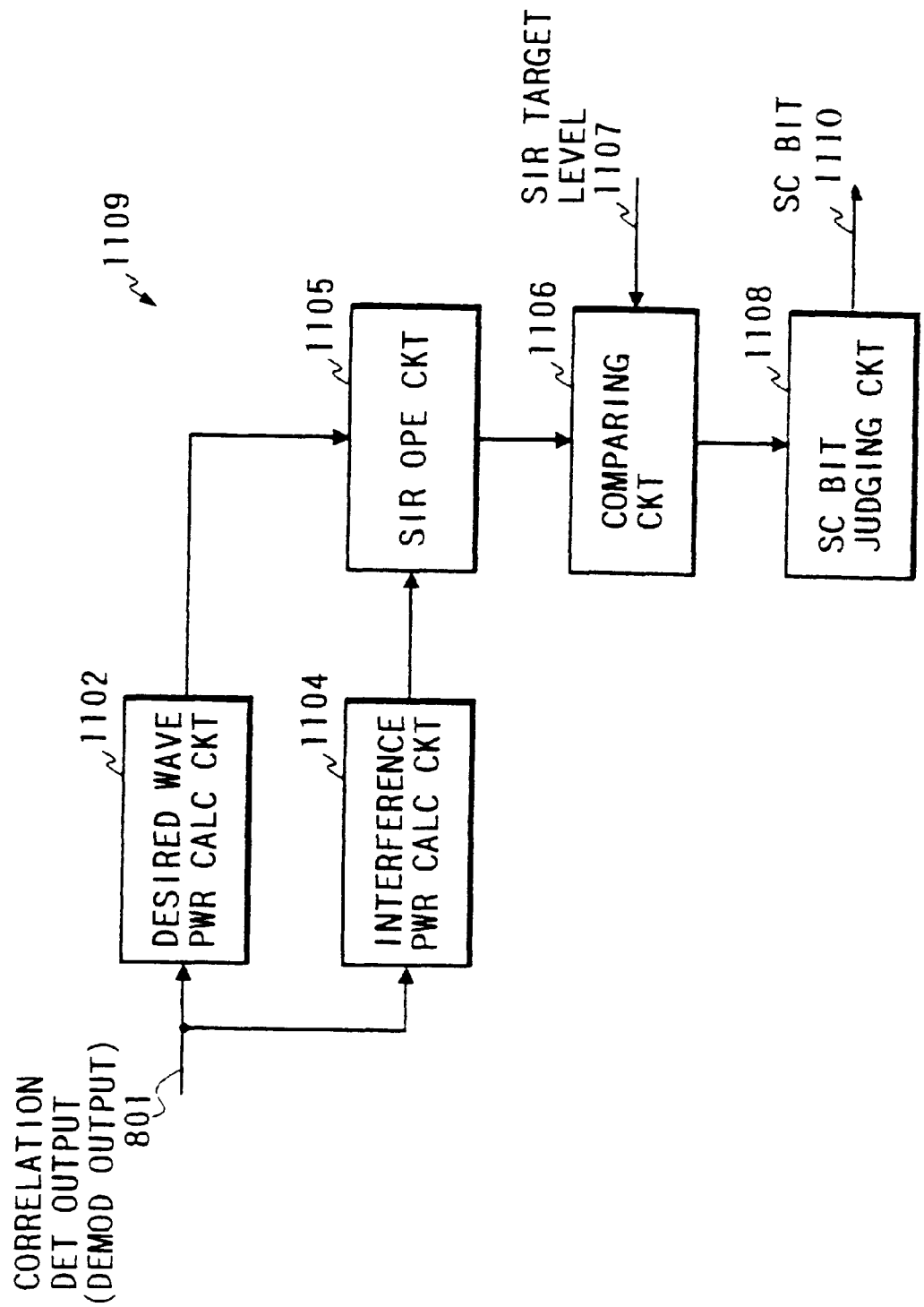
FIG. 11 is a block diagram of a transmission power control signal generation circuit of a fifth embodiment.

FIG. 11 is a block diagram of a transmission power control signal generation circuit 1100 of a fifth embodiment and FIG. 10 also shows a communication apparatus of the fifth embodiment. The communication apparatus 1100 of the fifth embodiment has substantially the same structure and operation as those of the fourth embodiment. The difference is that the transmission power control signal generation circuit 1109 is used instead of the transmission power control signal generation circuit 1009.

The transmission power control signal generation circuit 1109 comprises a desired wave power calculation circuit 1102 for calculating a reception power of a desired wave component at the antenna 1001, an interference power calculation circuit 1104 for calculating a reception power of interference wave components at the antenna 1001, an SIR operation circuit for operating a signal to interference power ratio (SIR), a comparing circuit 1106 for comparing the signal to interference power ratio with an SIR target level 1107 to output an error in the signal to interference power ratio, an sc bit judging circuit 1108 for judging the error in the signal to interference power ratio, wherein if the error exceeds a predetermined value, the sc bit judging circuit 1108 outputs the sc bit 1110.

The desired wave power calculation circuit 1102 periodically calculates the reception power of a desired wave component at the antenna 1001 from the correlation detection output 801 or a demodulation output which is obtained by the demodulation circuit 1007 by removing a carrier component from the correlation detection output. The interference power calculation circuit 1104 periodically calculates the reception power of interference wave components at the antenna 1001 from the correlation detection output 801 or the demodulation output 1007a. In these operations, cycles of calculation of reception power of the desired wave component and the interference wave components may be different from each other.

The SIR operation circuit 1105 operates the signal to interference power ratio (SIR) from the calculated reception power of the desired wave component and the calculated reception power of the interference wave components. The comparing circuit 1106 compares the signal to interference power ratio with an SIR target level 1107 to obtain the error in the signal to interference power ratio. The sc bit judging circuit 1108 judges the error in the signal to interference power ratio. If the error exceeds a predetermined value, the sc bit judging circuit 1108 outputs the sc bit 1109.

The sc bit is transmitted in the first CDMA signal from the antenna 1001.

Figure 12:
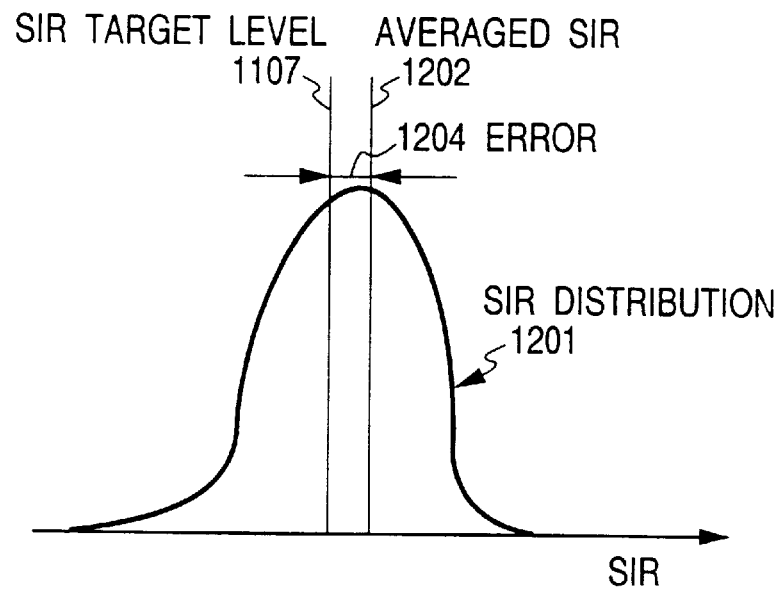
FIG. 12 is a graphical drawing of the fifth embodiment illustrating obtaining the error.

FIG. 12 is a graphical drawing of the fifth embodiment illustrating obtaining the error 1204 between the SIR target level 1107 and the averaged SIR 1202. In this embodiment, the error is determined from the SIR 1202. However, it is also possible to provide the error from a center value or an SIR having a higher possibility from the SIR distribution 1201. The amount of the correction is determined by a variance of the SIR distribution 1201 and is transmitted in the sc bit.

<SIXTH EMBODIMENT>

Figure 13:
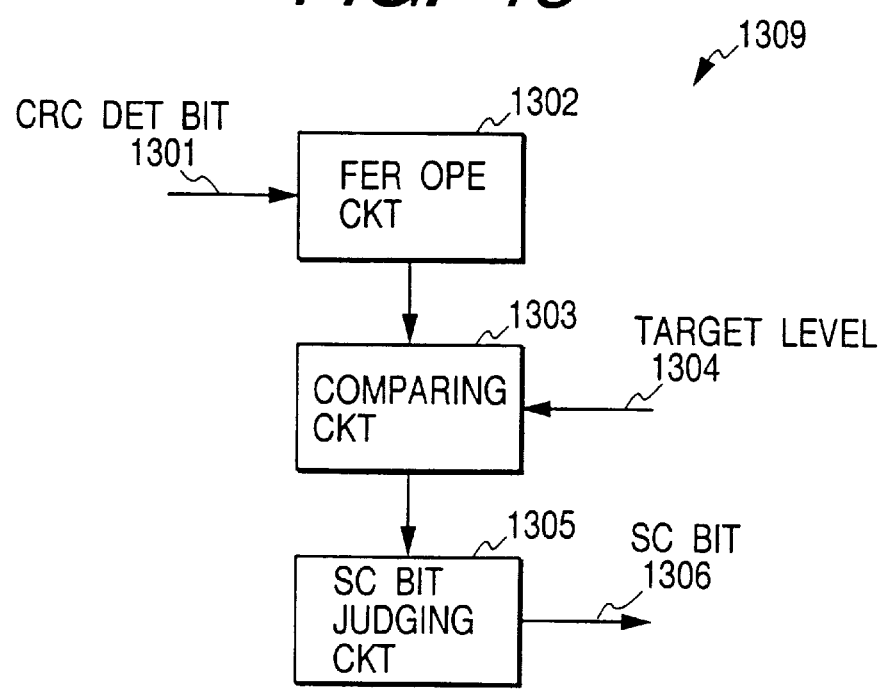
FIG. 13 is a block diagram of a transmission power control signal generation circuit of a sixth embodiment.

FIG. 13 is a block diagram of a transmission power control signal generation circuit 1309 of a sixth embodiment and a communication apparatus 1300 of the sixth embodiment is also shown in FIG. 10. A communication apparatus 1300 of the sixth embodiment has substantially the same structure and operation as those of the fourth embodiment. The difference is that the transmission power control signal generation circuit 1309 is used instead the transmission power control signal generation circuit 1009.

The transmission power control signal generation circuit 1309 comprises a frame error rate operation circuit 1302 for operating a frame error rate from error detection information (a CRC detection bit) 1301 from the demodulation circuit 1007, a comparing circuit 1303 for comparing the frame error rate with a target level 1304 to output an error in the frame error rate, an sc bit judging circuit 1305 for judging the error to output the sc bit 1306, wherein if the error in the frame error rate exceeds a predetermined value, the sc bit judging circuit 1305 outputs the sc bit 1306.

The demodulation circuit 1007 effects the error correction operation as mentioned above. During this operation the demodulation circuit outputs the error detection information, that is, the CRC detection bit 1301.

The frame error rate operation circuit 1302 operates the frame error rate from the CRC detection bit 1301 from the demodulation circuit 1007. The comparing circuit 1303 compares the frame error rate with the target level 1304 to output the error in the frame error rate. The sc bit judging circuit 1305 judges the error. If the error in the frame error rate exceeds a predetermined value, the sc bit judging circuit 1305 outputs the sc bit 1306.

<SEVENTH EMBODIMENT>

Figure 14:
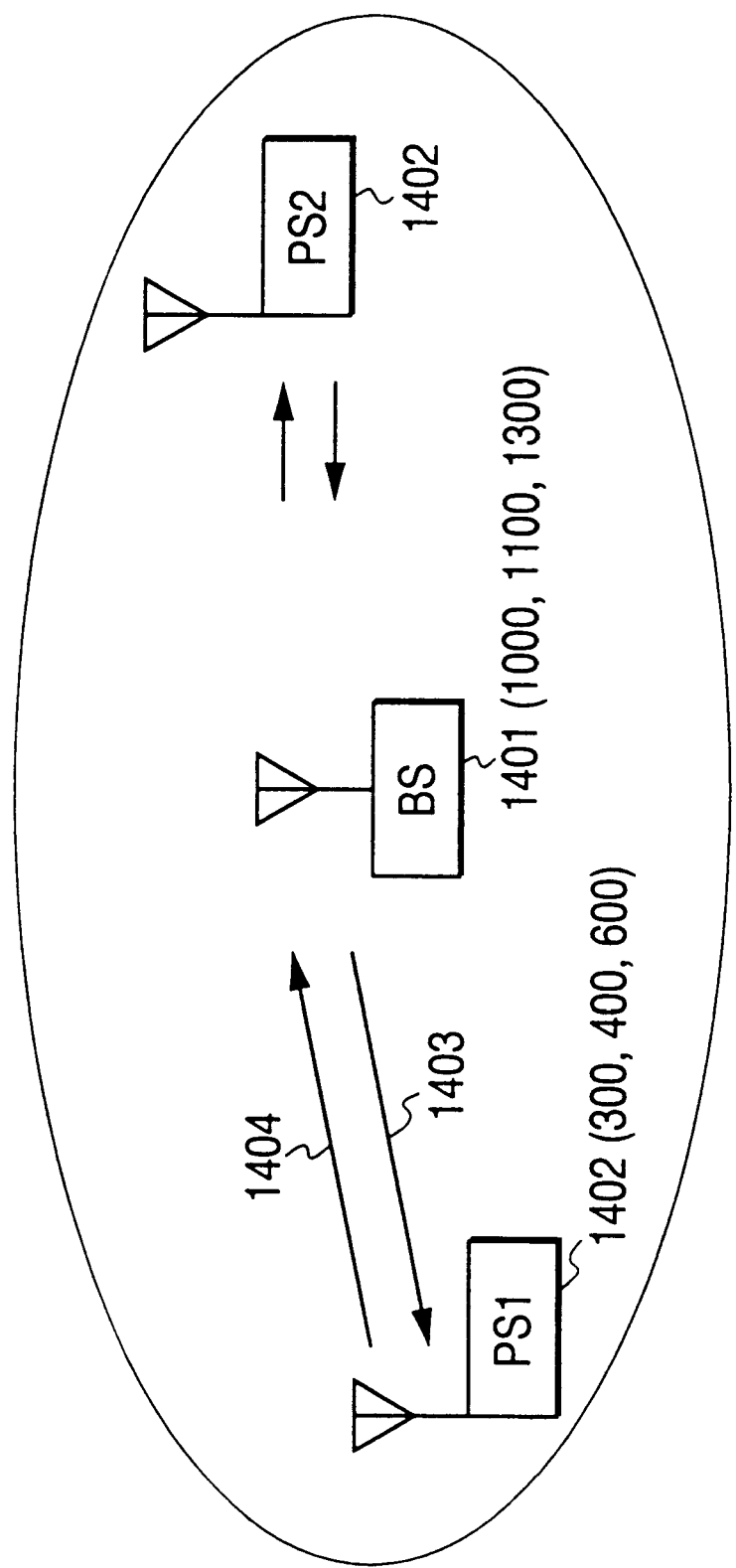
FIG. 14 is a block diagram of a communication system of a seventh embodiment.

FIG. 14 is a block diagram of a communication system of a seventh embodiment. The communication system of the seventh embodiment uses any of the communication apparatus 300, 400, or 600 of the first to third embodiments as the mobile unit 1402 and any of the communication apparatus 1000, 1100, or 1300 of the fourth to sixth embodiments as the base station 1401.

The communication system of the seventh embodiment comprises the communication apparatus 1401 as a base station for transmitting the first CDMA radio wave signal 1403 including the sc bit and receiving the second CDMA radio wave signal 1404 and a plurality of communication stations 1402 as a mobile unit for receiving the first CDMA radio wave signal 1403 and transmitting the second CDMA radio wave signal 1404 with the transmission power controlled in accordance with the detected reception power and the sc bit through the power control table.

FIG. 15 shows a timing chart of the communication apparatus of the seventh embodiment. In the base station 1401, the sc bit is detected every four frames, that is, 40 ms. The transmission data is transmitted every frame of 10 ms and an interleaving processing of 10 ms is effected. The open loop transmission power control in the mobile unit 1402, that is, the transmission control in accordance with the reception power through the power control table is effected at the cycle $T2 \leq 10$ ms.

In the base station 1401, the sc bit is judged every 40 ms from the reception signal BSRX at t1 (t5, t6) and the sc bit is transmitted through the first CDMA radio wave signal (BSTX) at a timing t2 with an interleaving delay of one frame. At a timing t3, the mobile unit 1402 receives the first CDMA radio wave signal and the sc bit detector 309 detects the sc bit at a timing t4 with a de-interleaving delay of one frame developed in demodulating.

As mentioned, in the communication system of the seventh embodiment, the mobile unit 1402 compensates the power control table with the control signal (the sc bit) periodically transmitted from the base station 1401, so that the control error in the open loop controlling of the transmission power control can be compensated. Moreover, the sc bit cycle T1 determined in consideration of a variation in the temperature characteristic or a traffic variation is relatively longer than the cycle T2 of the transmission power controlling in accordance with the reception power determined in consideration of fading. Therefore, it is possible to transmit the sc bit in a low speed accompanied channel (SACCH). Therefore, an amount of control signals per a predetermined interval can be reduced, so that a frequency utilizing efficiency can be increased.

What is claimed is:

1. A communication apparatus comprising:
   receiving and transmitting means having an antenna for receiving a first CDMA radio wave signal, detecting a desired wave component including a control signal from said first CDMA radio wave signal, and transmitting a second CDMA radio wave signal;
   detection means for detecting an electric power of the detected desired wave component;
   table means for storing a relation between said detected electric power and an electric power of said second CDMA radio wave signal to be transmitted, said control signal indicating compensation of said relation;
   demodulating and detection means for demodulating the detected desired wave component and outputting demodulation data and for detecting said control signal from the detected desired wave component;
   compensation means for compensating said relation in accordance with said detected control signal;
   determining means for determined an actual electric power of said second CDMA radio wave signal to be transmitted in accordance with the compensated said relation; and
   transmission power control means for controlling a transmission power of said second CDMA radio wave signal in accordance with said actual electric power.

2. A communication apparatus as claimed in claim 1, further comprising:
   sampling and storing means for sampling and storing the detected electric power; and
   compensating range determining means for determining a portion of a range of said detected electric power in accordance with the stored detected electric power, wherein said compensation means compensates said relation within said range.

3. A communication apparatus as claimed in claim 1, wherein said compensation means comprises allowable range data receiving means for receiving allowable range data and said compensation means compensates said relation within said allowable range of said electric power of the second CDMA radio wave signal to be transmitted in accordance with the received allowable range data.

4. A communication apparatus comprising:
   transmitting and receiving means having an antenna for transmitting a first CDMA radio wave signal including a control signal, receiving a second CDMA radio wave signal, and detecting a desired wave component and interference wave components from said second CDMA radio wave signal;
   first electric power calculation means for calculating a first electric power from said detected desired wave component at a first cycle;
   second electric power calculation means for calculating a second electric power from the detected interference wave components at a second cycle which is different from said first cycle;
   operation means for operating a signal to interference power ratio from the detected first and second electric powers;

comparing means for obtaining an error between said signal to interference power ratio and a target value and comparing said error with a predetermined value; and control signal generation means for generating said control signal when said error exceeds said predetermined value.

5. A communication system comprising a plurality of mobile stations and a base station, each of said mobile stations comprising:

receiving and transmitting means having a first antenna for receiving a first CDMA radio wave signal, detecting a first desired wave component including a control signal, and transmitting a second CDMA radio wave signal;

detection means for detecting an electric power of a first desired wave component of the received first CDMA radio wave signal;

table means for storing a relation between said detected electric power and an electric power of said second CDMA radio wave signal to be transmitted, said control signal indicating compensation of said relation;

demodulation and detection means for demodulating said received first desired wave component and outputting demodulation data and for detecting said control signal from said received first desired wave component;

compensation means for compensating said relation in accordance with said detected control signal;

determining means for determined an actual electric power of said second CDMA radio wave signal to be transmitted in accordance with the compensated said relation; and transmission power control means for controlling a transmission power of said second CDMA radio wave signal in accordance with said actual electric power, said base station comprising:

transmitting and receiving means having a second antenna for transmitting said first CDMA radio wave signal including said control signal, receiving said second CDMA radio wave signal, and detecting a second desired wave component from said second CDMA radio wave signal;

electric power detection means for repeatedly detecting an electric power of a second desired wave component of the received second CDMA radio wave signal;

averaging means for averaging the repeatedly detected electric powers to obtain an average;

comparing means for obtaining an error between said average and a target value and comparing said error with a predetermined value; and control signal generation means for generating said control signal when said error exceeds said predetermined value.

6. A communication system as claimed in claim 5, wherein each of said mobile station further comprising:

sampling and storing means for sampling and storing the detected electric power; and compensating range determining means for determining a portion of a range of said detected electric power in accordance with the stored detected electric power, wherein said compensation means compensates said relation within said range.

7. A communication system as claimed in claim 5, wherein said compensation means comprises allowable range data receiving means for receiving allowable range data and said compensation means compensates said relation within said allowable range of said electric power of said second CDMA radio wave signal to be transmitted in accordance with the received allowable range data.

* * * * *